United States Patent [19]

Audeh et al.

[11] 4,062,763

[45] Dec. 13, 1977

[54] REACTIVATION OF HYDROFINISHING CATALYST FOR COLOR REMOVAL ACTIVITY

[75] Inventors: Costandi A. Audeh, Princeton; Robert F. Bridger, Hopewell, both of N.J.

[73] Assignee: Mobil Oil Corporation, New York, N.Y.

[21] Appl. No.: 717,829

[22] Filed: Aug. 26, 1976

[51] Int. Cl.² .......................................... C10G 23/02
[52] U.S. Cl. .................................... 208/264; 252/414
[58] Field of Search ................ 208/143, 264; 252/414

[56] References Cited

U.S. PATENT DOCUMENTS

| | | | |
|---|---|---|---|
| 2,790,751 | 4/1957 | Gerald | 208/250 |
| 3,870,624 | 3/1975 | Tice et al. | 208/264 |
| 3,904,511 | 9/1975 | Heiba et al. | 208/177 |

Primary Examiner—Herbert Levine
Attorney, Agent, or Firm—Charles A. Huggett; Dennis P. Santini

[57] ABSTRACT

A method is provided for reactivation of color removal activity of hydrofinishing catalyst which comprises contacting aged hydrofinishing catalyst exhibiting degraded color removal activity with a small amount of added elemental sulfur dissolved in hydrocarbon oil under mild contact conditions for a time sufficient to reactivate the color removal activity of the catalyst.

10 Claims, No Drawings

REACTIVATION OF HYDROFINISHING CATALYST FOR COLOR REMOVAL ACTIVITY

BACKGROUND OF THE INVENTION

1. Field of the Invention

This invention relates to a method for improving color removal activity of aged hydrofinishing catalyst exhibiting reduced color removal activity. In particular, it relates to contacting such an aged catalyst with a small amount of added elemental sulfur dissolved in hydrocarbon oil, such as the feed oil to the hydrofinishing process utilizing said aged catalyst, at mild contact conditions.

2. Description of the Prior Art

In hydrofinishing a lubricating oil for upgrading color thereof a continuous increase in processing temperature is necessary for maintaining color activity of the hydrofinishing catalyst utilized in the process at an acceptable level. Since high hydrofinishing temperatures are detrimental to oxidation stability of a finished oil, a hydrofinishing process wherein steadily increasing temperature are required to maintain color activity of the catalyst fast approaches non-utility. The present method allows continuing use of lower hydrofinishing temperatures and, in fact, quite mild hydrofinishing process conditions throughout a hydrofinishing process by improving or maintaining catalyst color activity at those mild conditions. The present method eliminates the need for process shutdown for the purpose of regenerating the hydrofinishing catalyst relative to color removal activity. No method is known at present which so effectively and easily alleviates the above processing problems as the present invention.

SUMMARY OF THE INVENTION

In accordance with the present invention there is provided an improved method for reactivating the color removal activity of aged hydrofinishing catalyst. Therefore, in a process wherein a lubricating oil stock is contacted with hydrogen in the presence of a hydrofinishing catalyst such as alumina impregnated or deposited with CoO and/or $MoO_3$, the process conditions may be maintained at relatively mild levels while color removal activity of the catalyst is maintained by the present method. The present method involves contacting the aged, partially or fully deactivated hydrofinishing catalyst with from about 0.05 to about 2 weight percent of added, i.e. additional to that already present in the oil stock feed to the process, elemental sulfur dissolved in hydrocarbon oil, e.g. the feed stock oil to the hydrofinishing process for in site reactivation, for a time of from about 2 to about 48 hours while maintaining the hydrofinishing process reaction conditions at a mild level, e.g. at temperature of from about 80° C to about 200° C, a pressure of from about 100 psig to about 300 psig, a liquid hourly space velocity (LHSV, vol oil/vol. catalyst) of from about 0.1 to about 10 $hr^{-1}$ and a hydrogen circulation rate of from about 100 to about 1500 scf/bbl.

DESCRIPTION OF SPECIFIC EMBODIMENTS

The lubricating oil stocks which may be treated in the hydrofinishing process in which the present method is employed may generally be any high boiling range materials boiling above about 600° F. Such lubricating oil stock materials include those obtained by fractionation, as by, for example, vacuum distillation, of crude oils identified by their source, i.e. Pennsylvania, Midcontinent, Gulf Coast, West Texas, Amal, Kuwait, Barco and Arabian. Said oil stock materials may include one having a substantial part thereof of the fractionation product of the above crude oils mixed with other oil stocks.

The elemental sulfur dissolved in hydrocarbon oil employed in the present method may be in any of several allotropic forms such as $S_6$, $S_8$ or polymeric sulfur and may be used in very small amounts of from about 0.05 to about 2 percent by weight of the hydrocarbon oil (e.g. lubricating oil stock), with a preferably range of from about 0.2 to about 1 percent by weight.

It is interesting to note that the sulfur already present in the lubricating oil stock subjected to hydrofinishing, whether naturally occurring or added by some prior process treatment, is substantially chemically bound up in the oil and is unable to provide reactivation of the catalyst in situ.

Operating parameters in a hydrofinishing process for lubricating oil stock are critical, especially reaction temperature and pressure since too great a pressure or too high a temperature will cause undesirable hydrogenating of the oil. The reaction pressure of the hydrofinishing process must be maintained within the range of from about 100 psig to about 300 psig, with a preferred pressure being within the range of from about 150 psig to about 250 psig. Reaction temperature should be maintained within the range of from about 80° C to about 200° C, with a preferred temperature within the range of from about 150° C to about 175° C. Hydrogen must be present in the hydrofinishing process with hydrogen circulation being maintained within the range of from about 100 scf/bbl to about 1500 scf/bbl, preferably from about 500 scf/bbl to about 1100 scf/bbl. The hydrofinishing process may be conducted in a flow reactor or under conditions comparable to those existing in a flow reactor with a liquid hourly space velocity of from about 0.1 $hr^{-1}$ to about 10 $hr^{-1}$ (vol. oil/vol. catalyst), preferably from about 0.5 $hr^{-1}$ to about 2.5 $hr^{-1}$.

The above conditions are easily maintained over long periods of time without the necessity of increasing temperature to provide acceptable color to the finished oil product when the present reactivation method is employed. The above conditions are, in fact, the conditions required for the present method.

As the color removal activity of hydrofinishing catalyst diminishes and temperature requirements are increased to near the top of the above range for acceptable color properties in the finished oil product, the elemental sulfur dissolved in hydrocarbon oil as above described may be introduced into the lubricating oil stock feed stream either continuously or in intermittent spurts or slugs. The limiting factor relative to contact of the aged catalyst with the elemental sulfur so introduced to the feed stream is a contact time of from about 2 to about 48 hours, or preferably from about 10 to about 24 hours, under the above mild processing conditions. During the contacting, the color removal activity of the hydrofinishing catalyst is increased and, therefore, hydrofinishing temperature requirements are maintained within the above range.

In order to more fully illustrate the method of the present invention, the following specific examples, which in no sense limit the invention, are presented. The test method used therein was the standard Color Test designated ASTM-D1500.

The lubricating oil stock used in the following examples was conventionally refined by distillation, followed by furfural extraction and methyl ethyl ketone dewaxing. It is identified in Table 1 according to source, physical properties and furfural extraction conditions.

TABLE 1
CRUDE SOURCE AND NOMINAL VISCOSITY OF LUBRICATION OIL STOCK USED HEREIN

|  | 150 S.U.S. Arabian Light |
|---|---|
| Furfural Dosage, % volume | 180 |
| Tower Temp., °F, Top | 185 |
| Tower Temp., °F, Bottom | 140 |
| Gravity, °API | 30.9 |
| Pour Pt., °F | 0 |
| Flash Pt., °F | 410 |
| Sulfur, % wt. | 0.63 |
| Nitrogen, % wt. | 0.0029 |
| Aniline Point, °F | 210 |
| Viscosity, S.U.S. at 100° F | 152 |
| Viscosity Index | 103 |
| ASTM Color | 1½ |

The elemental sulfur used in the following examples was commercially available flowers of sulfur and the hydrofinishing catalysts were commercially available Co/Mo on alumina and Mo on alumina hydrofinishing catalysts exhibiting the properties, when fresh, listed in Table 2. Catalyst A was a 1/16-inch extrudate. Catalyst B was a 1/32-inch extrudate. Catalyst C was 10–12 mesh pellets.

TABLE 2

| Catalyst | Properties of Fresh Catalysts | | |
|---|---|---|---|
|  | A | B | C |
| Pore Volume, cc/g | 0.512 | 0.491 | 0.431 |
| Packed Density, g/cc | 0.771 | 0.786 | — |
| Adj. Pore Volume, cc/cc | 0.395 | 0.386 | — |
| Pore Size Distribution, cc/cc |  |  |  |
| 0–50 Å | 0.069 | 0.135 | — |
| 50–100 | 0.230 | 0.239 | — |
| 100–150 | 0.073 | 0.004 | — |
| 150–200 | 0.004 | 0 | — |
| 200 | 0.019 | 0.008 | — |
| CoO, Wt. % | 2.5 | 3.4 | — |
| MoO$_3$, Wt. % | 13.1 | 13.4 | 11.3 |

EXAMPLE 1

A quantity of the above-defined lubricating oil stock was passed through a fixed bed reactor containing 20 ml. of catalyst C at 200° C, 200 psig, 1,000 scf/bbl of hydrogen and 1 LHSV (hr$^{-1}$) for 96 hours. The next 3 hours of the process was conducted with the feed stock having dissolved therein 1.0 weight percent of added elemental sulfur while maintaining the process conditions as above noted. Thereafter, the process was continued under the above conditions for 70 additional hours with the lubricating oil stock not containing added elemental sulfur. Samples of lubricating oil product from the process were taken at 88, 97 ½ and 134 hours. The color of the samples according to ASTM D1500 was as follows:

| Sample at | Color |
|---|---|
| 88 hours | 1 |
| 97½ hours | Colorless |
| 134 hours | ½ |

EXAMPLE 2

A quantity of the above oil stock was passed through a fixed bed reactor containing 15 ml. of catalyst A at 175° C, 200 psig, 1,000 scf/bbl of hydrogen and 1 LHSV (hr$^{-1}$) for 480 hours. While maintaining these process conditions, the next 24 hours of the process were fed with the above oil stock containing 0.2 weight percent added elemental sulfur dissolved therein. Samples of lubricating oil product from the process were taken at 468 and 494 hours. The color of the samples was as follows:

| Sample at | Color |
|---|---|
| 468 hours | 1½ |
| 494 hours | ½ |

EXAMPLE 3

A quantity of the above oil stock was passed through a fixed bed reactor containing 15 ml. of catalyst B at 175° C, 200 psig, 1,000 scf/bbl of hydrogen and 1 LHSV (hr$^{-1}$) for 130 hours. While maintaining these process conditions, the next 24 hours of the process were fed with the above oil stock containing 0.2 weight percent added elemental sulfur dissolved therein. Samples of lubricating oil product from the process were taken at 128 and 140 hours. The color of the samples was as follows:

| Sample at | Color |
|---|---|
| 128 hours | ½ |
| 140 hours | Colorless |

What is claimed is:

1. A method for reactivating color removal activity of aged hydrofinishing catalyst which comprises contacting said catalyst with from about 0.05 to about 2 weight percent of added elemental sulfur dissolved in hydrocarbon oil for from about 2 to about 48 hours while maintaining method conditions at a temperature of from about 80° C to about 200° C, a pressure of from about 100 psig to about 300 psig, a liquid hourly space velocity of from about 0.1 hr$^{-1}$ to about 10 hr$^{-1}$ and a hydrogen circulation rate of from about 100 scf/bbl to about 1500 scf/bbl.

2. The method of claim 1 wherein said hydrocarbon oil is the lubricating oil stock feed to a hydrofinishing process whereby said reactivating is conducted in situ said hydrofinishing process being conducted at a temperature of from about 80° C to about 200° C, a pressure of from about 100 psig to about 300 psig, a liquid hourly space velocity of from about 0.1 hr$^{-1}$ to about 10 hr$^{-1}$ and a hydrogen circulation rate of from about 100 scf/bbl to about 1500 scf/bbl.

3. The method of claim 2 wherein said oil stock feed has a boiling range of above about 600° F.

4. The method of claim 1 wherein said catalyst is contacted with from about 0.2 to about 1 weight percent of added elemental sulfur dissolved in hydrocarbon oil.

5. The method of claim 2 wherein from about 0.2 to about 1 weight percent of added elemental sulfur is dissolved in said lubricating oil stock.

6. The method of claim 1 wherein said contacting is conducted for from about 10 to about 24 hours at a temperature of from about 150° C to about 175° C, a pressure of from about 150 psig to about 250 psig, a liquid hourly space velocity of from about 0.5 hr$^{-1}$ to about 2.5 hr$^{-1}$ and a hydrogen circulation rate of from about 500 scf/bbl to about 1100 scf/bbl.

7. The method of claim 2 wherein said contacting is conducted for from about 10 to about 24 hours at a temperature of from about 150° C to about 175° C, a pressure of from about 150 psig to about 250 psig, a liquid hourly space velocity of from about 0.5 hr$^{-1}$ to about 2.5 hr$^{-1}$ and a hydrogen circulation rate of from about 500 scf/bbl to about 1100 scf/bbl.

8. The method of claim 3 wherein said contacting is conducted for from about 10 to about 24 hours at a temperature of from about 150° C to about 175° C, a pressure of from about 150 psig to about 250 psig, a liquid hourly space velocity of from about 0.5 hr$^{-1}$ to about 2.5 hr$^{-1}$ and a hydrogen circulation rate of from about 500 scf/bbl to about 1100 scf/bbl.

9. The method of claim 8 wherein said oil stock feed is one obtained by fractionation of crude oil identified as Pennsylvania, Midcontinent, Gulf Coast, West Texas, Amal, Kuwait, Barco or Arabian.

10. The method of claim 9 wherein said oil stock feed is obtained by fractionation of crude oil identified as Arabian.

* * * * *

UNITED STATES PATENT AND TRADEMARK OFFICE
CERTIFICATE OF CORRECTION

PATENT NO. : 4,062,763
DATED : December 13, 1977
INVENTOR(S) : COSTANDI A. AUDEH and ROBERT F. BRIDGER It is certified that error appears in the above-identified patent and that said Letters Patent are hereby corrected as shown below:

Column 1, line 52   "in site" should read --in situ--.
Column 1, line 55   "e.g. at" should read --e.g. a--.
Column 2, line 12   "preferably" should read --preferable--.
Column 4, line 56   "in situ" should read --in situ,--.
Column 5, Claim 5,
        line 3      Delete the word "about".

Signed and Sealed this

Second Day of May 1978

[SEAL]

Attest:

RUTH C. MASON
Attesting Officer

LUTRELLE F. PARKER
Acting Commissioner of Patents and Trademarks